(12) United States Patent
Yorukoglu

(10) Patent No.: US 8,747,273 B2
(45) Date of Patent: Jun. 10, 2014

(54) MECHANISM TRANSFORMING ROTATIONAL MOVEMENT TO DIFFERENT MOVEMENT CHARACTERISTICS

(75) Inventor: Sancar Yorukoglu, Bursa (TR)

(73) Assignee: Coskunoz Metal Form Makina Endustri ve Tic. A.S., Bursa (TR)

( * ) Notice: Subject to any disclaimer, the term of this patent is extended or adjusted under 35 U.S.C. 154(b) by 436 days.

(21) Appl. No.: 13/046,956

(22) Filed: Mar. 14, 2011

(65) Prior Publication Data
US 2011/0230303 A1 Sep. 22, 2011

(30) Foreign Application Priority Data

Mar. 16, 2010 (TR) .............................. a 2010 01999

(51) Int. Cl.
*F16H 1/32* (2006.01)

(52) U.S. Cl.
USPC .......................................... 475/162; 475/343

(58) Field of Classification Search
USPC .......... 475/331, 269, 296, 343, 302, 162, 170
See application file for complete search history.

(56) References Cited

U.S. PATENT DOCUMENTS 3,115,791 A * 12/1963 Dean .............................. 475/269
4,089,228 A * 5/1978 Obra ................................. 74/52

* cited by examiner

*Primary Examiner* — David D Le
*Assistant Examiner* — Ryan Dodd
(74) *Attorney, Agent, or Firm* — Gardner Groff Greenwald & Villanueva, PC

(57) ABSTRACT

The invention relates to a movement transformation mechanism comprising a main planet gear (20); a planet carrier (30) which rotates together with said main planet gear (20); a ring gear (40) which is positioned at the continuation of said planet carrier (30) independent of the planet carrier (30) and which has at least an inner surface with a gear structure and a main planet gear (50) which is rotatably connected to the planet carrier (30) and whose thread is in contact with the thread on the inner surface of the ring gear (40) and whereon the rod arm (100) is hinged. In said mechanism, the diameter of said ring gear (40) is at least two times greater than the diameter of the main planet gear (50) provided that the diameter ratio is always an integer.

9 Claims, 6 Drawing Sheets

MECHANISM TRANSFORMING ROTATIONAL MOVEMENT TO DIFFERENT MOVEMENT CHARACTERISTICS

CROSS-REFERENCE TO RELATED APPLICATION

This application claims priority to Turkish Patent Application Serial No. 2010/01999 filed on Mar. 16, 2010, the entirety of which is hereby incorporated herein by reference for all purposes.

FIELD OF THE INVENTION

The present invention relates to mechanisms transforming rotational movement to different movement characteristics.

BACKGROUND

There is a plurality of applications where rotational movement has to be converted to another different movement type. For instance, in machines like eccentric press, crank-connection rod mechanisms are used converting rotational movement to linear movement. In more details, such presses operate with the kinetic power of a big circular metal (flywheel) accelerated by an electric motor. Accordingly, the flywheel rotates continuously by means of the rotation movement it takes from the motor, however, the flywheel spindle does not rotate. When it is desired to be pressed on the piece, the flywheel spindle begins rotating by means of a clutch control like pedal. The rotation movement on the flywheel spindle is transferred to the eccentric spindle functioning as a crank by decreasing of the rotation number by means of gears. The function of the eccentric spindle is to transform circular movement to linear movement. Thus, linear movement (it is called press movement distance or stroke in the related technical field) equal to the eccentricity of the crank spindle is realized to the movable ram connected to the rod arm which is connected to the press crank spindle.

This embodiment which is widespread in the technical field has some disadvantages. For instance, in general the movement distance (it is called course in the related technical field) in these presses is constant. On the other hand, in press processes, the movement distance of the manufactured piece required with respect to the drawing depth changes. Therefore, in crank-connection rod and link-drive mechanism presses, the press is designed with respect to the maximum movement distance required and it realizes said course in every tour thereof even if most of the time this is not required. This means making the upper mould and the ram body do unnecessary movements and lose energy.

In the presses (course adjusted presses) where the movement distance can be adjusted, this adjustment process is a process which takes a long time and which requires labor. The amount of the eccentricity is determined using a piece called wedge for adjustment whose thickness increases along the length thereof, thus the press movement distance is increased or decreased. For this process, naturally the press should be stopped for a while and thus the production in the line where the press is placed should be stopped for a while. This process which takes a long time to be completed leads to time and production loss in mass production lines. Moreover, in the presses with low tonnage and in C-type presses, automatic course adjustment can be realized.

Moreover, as known in the technical field, in order to obtain a functional movement characteristic, the displacement distance should be limited in maximum to the radius of the eccentric gear. Thus, for longer distances, eccentric gears with a bigger diameter should be manufactured. This situation limits the movement distance of the press to be produced, with the bench capacity used in thread forming; thus since a more advanced technology is required for processing bigger gears than a certain size, this increases costs seriously.

Another problem is that in these types of presses, particular movement characteristics can not be realized. For instance, in a press application, the press may have to move downwardly with a slow movement, it may have to accelerate after a certain point and it may have to stay for a certain time in press position to the piece. As a result, such a movement characteristics can not be realized by a standard crank-connection rod mechanism. Such an operation can be realized only by expensive systems like servo press in the present art.

As an advantageous and different solution, some press embodiments using a gear box similar to a planet gear system as drive transfer mechanism are disclosed. As known, planet gear system in general decreases revolution as a gear box, or it can be used for increasing torque or for decreasing torque. Accordingly, the concentricity of the ring gear, the planet carrier and the sun gear provides an important advantage in the fields requiring concentric power transfer. The planet gear systems which are the subject of these patents realize the transformation of rotational movement to linear movement, therefore they are used for a different purpose.

For instance, in the U.S. Pat. No. 3,158,057 where the drive system of a cinnamon cutter blade is explained, a main planet gear whereon a rod arm is hinged is moved along the inner surface of a main planet gear ring gear in a circular route and thus the rod arm moves downwardly-upwardly in a linear direction. In this embodiment, since the other planets and the sun gear are removed from the mechanism, the mechanism disclosed can not be used in processes with high tonnage where high response forces are formed. In practice, since all of the load will be applied to the hinge point on the main planet gear of the rod arm, the connection here can not endure the forces of hundreds and even thousands of tones. Anyhow since the mechanism in U.S. Pat. No. 3,158,057 is used for cinnamon cutting process, in such a process, high response forces do not exist, thus U.S. Pat. No. 3,158,057 does not comprise a solution in this direction.

In the U.S. Pat. No. 2,338,352, a press embodiment is disclosed which is suggested to endure high level of forces and which has a drive transfer mechanism similar to planet gear. Accordingly, an inner gear whereon the rod arm is hinged eccentrically realizes both rotational and orbital movement along the inner surface of a circular gear, thus the elliptical movement formed is transferred to the rod arm as a linear movement. However, in this patent, an effective solution which will distribute the force arriving to the main planet gear where the rod arm is hinged is not disclosed.

As a result, because of the abovementioned disadvantages, a novelty is required in the related technical field.

SUMMARY

The present invention is a novel movement transformation mechanism improved in order to eliminate above mentioned disadvantages and to bring new advantages to the relevant technical field.

An object of the subject matter invention is to provide a movement transformation mechanism which can transform rotational movement to different movement characteristics by means of simple adjustments to be realized thereon.

An object of the subject matter invention is to make the movement transformation mechanisms with gear boxes which are similar to planet gear group have more resistance to big forces.

Another object of the subject matter invention is to provide a movement transformation mechanism providing the easy changing of the movement distance and/or the hitting characteristics of the presses.

In order to realize all of the objects obtained from the above explanation and the below mentioned detailed explanation, the present invention relates to a movement transformation mechanism comprising a main planet gear; a planet carrier which rotates together with said main planet gear; a ring gear which is positioned at the continuation of said planet carrier and is independent of the planet carrier and which has at least an inner surface having a gear structure, and a main planet gear which is rotatably connected to the planet carrier and whose thread is in contact with the thread on the inner surface of the ring gear and whereon the rod arm is hinged. In said mechanism, the diameter of said ring gear is at least two times greater than the diameter of the main planet gear provided that the diameter ratio is always an integer. Moreover, in addition to the main planet gear, the subject matter mechanism comprises at least two support planet gears which are rotatably connected to the planet carrier and whose thread are in contact with the thread on the inner surface of the ring gear and between said main and support planet gears and it comprises at least one support gear group with a sun gear positioned so as to contact with these gears.

In a preferred embodiment of the present invention, the diameter of the ring gear is two times greater than the diameter of the main planet gear and the sun gear is not concentric with the ring gear.

In another preferred embodiment of the present invention, while the ring gear is held fixed, when the planet carrier is rotated, in order to provide linear movement of the hinge point, said hinge point is on the front surface of the main planet gear and it has a distance with the main planet gear center equal to the main planet gear radius.

In another preferred embodiment of the present invention, there are at least two additional support planet gears which are positioned so as not to contact with the gears in said support gear group, which are rotatably connected to the planet carrier and whose thread are in contact with the thread on the inner surface of the ring gear, and between said main and additional support planet gears, there is at least one additional support gear group with an additional sun gear which is positioned so as to contact with these gears.

In a preferred embodiment of the present invention, in order to change the position of the hinge point with respect to the orthogonal axis passing through the center of the ring gear, there is an adjustment mechanism which rotates the main planet gear in the own axis thereof by rotating the ring gear in the own axis thereof while the planet carrier is fixed.

In another preferred embodiment of the present invention, the ring gear of said adjustment mechanism comprises a geared external wall and accordingly a screwed spindle connected to said external wall.

In another preferred embodiment of the present invention, by changing the distance between the hinge point and the ring gear center, during the rotation of the planet carrier, in order to provide the movement of the hinge point in different orbits, the subject matter invention comprises additional hinge points on the main planet gear, whereon the rod arm will be hinged.

In another preferred embodiment of the present invention, there is a mechanism body with slots so as to comprise at least some of the main planet gear, planet carrier and the ring gear.

In another preferred embodiment of the present invention, said planet carrier comprises a narrow part connected to the main planet gear in a rigid manner and a wide part wherein the main and support planet gears and the sun gear are bedded, each of which has a hollow structure.

In another preferred embodiment of the present invention, said ring gear has a structure like a ring.

In another preferred embodiment of the present invention, the invention is used in a press or in an inner combustion motor.

The structural and the characteristic features and all the advantages of the subject matter invention can be understood more precisely by means of the detailed explanation which is written with references to these figures and therefore, it had to be evaluated with the detailed explanation and figures that are explained below.

Figure 4:
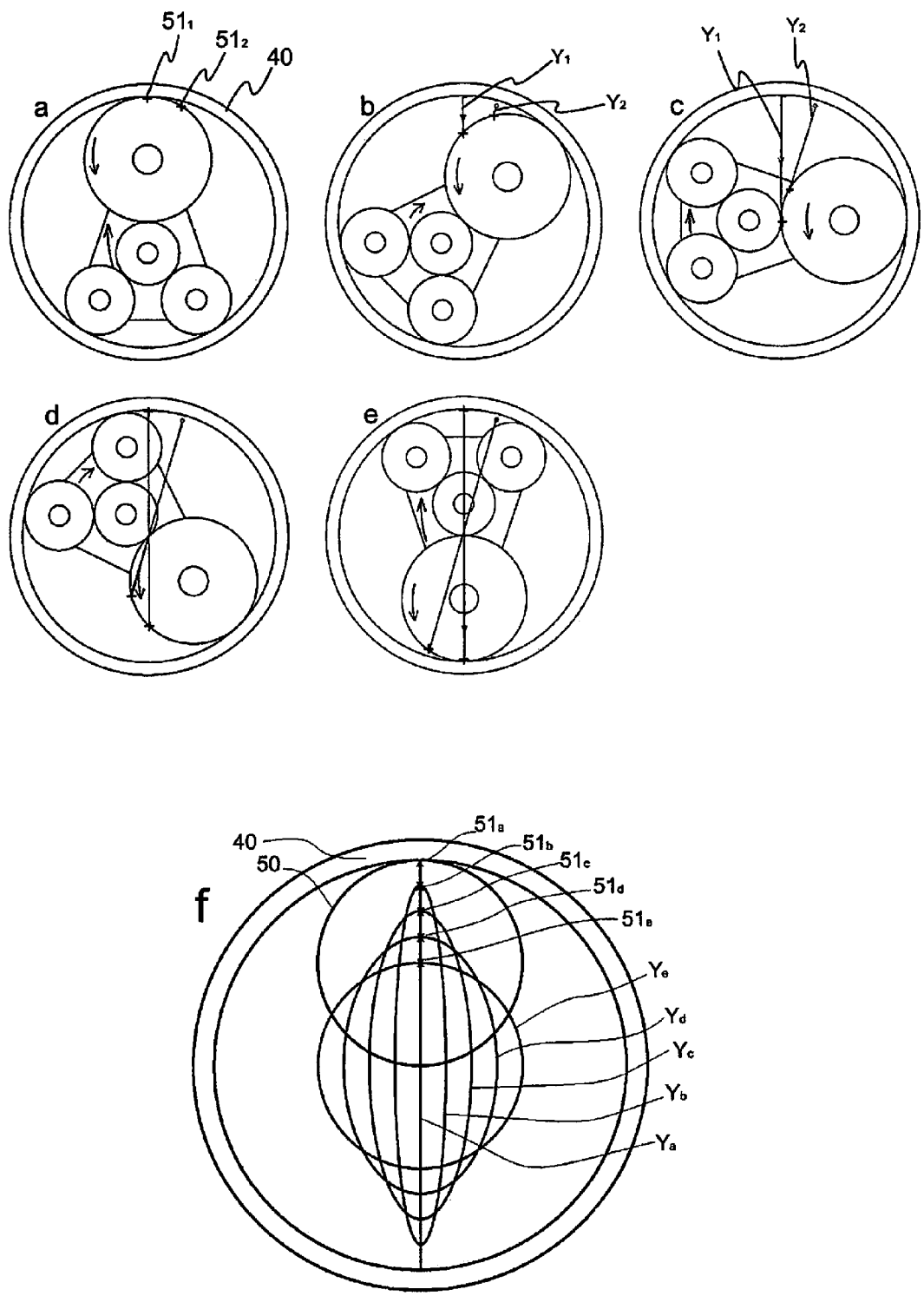

In the figures between FIGS. 4*a* and 4*e*, representative figures illustrating the operation characteristics of the subject matter mechanism are given.

In FIG. 4*f*, representative figures illustrating the operation characteristics of the subject matter mechanism with respect to different hinge point positions are given.

Figures 5A, 5B:
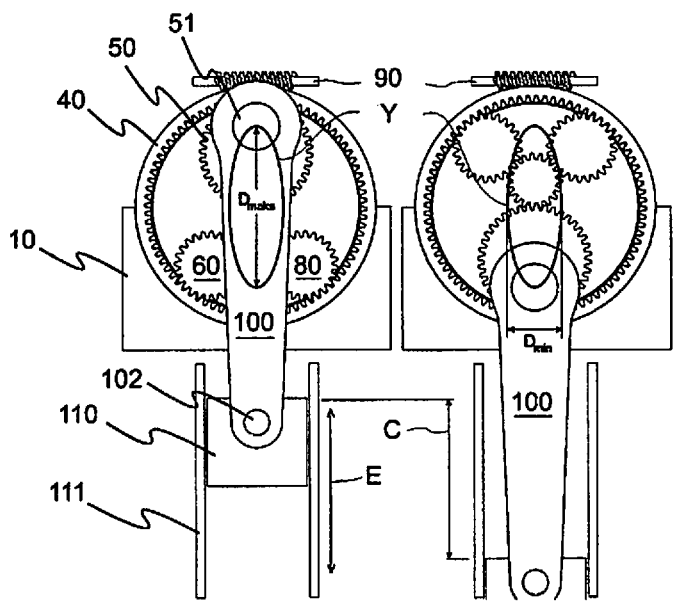
Figures 5C, 5D, 5E:
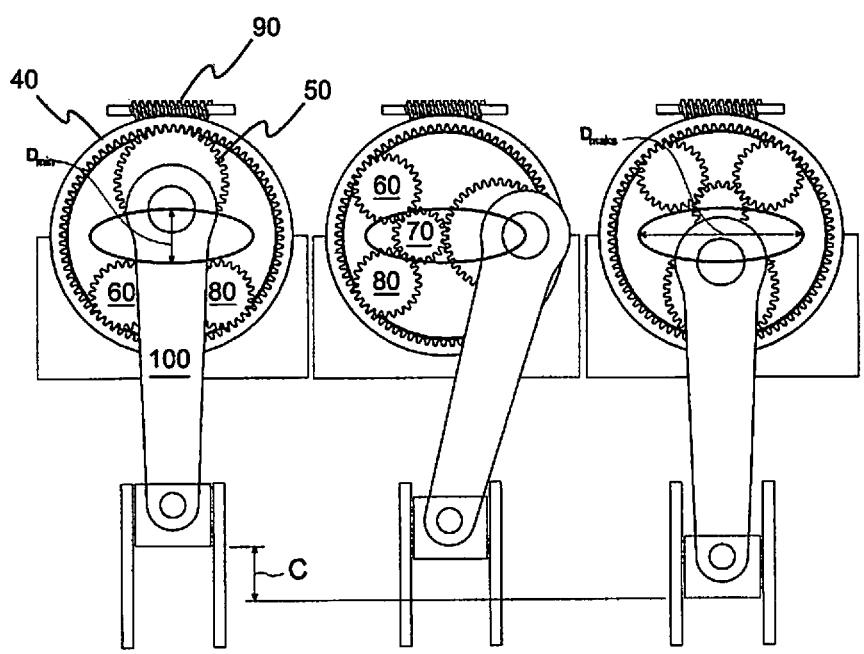

In the figures between FIGS. 5*a* and 5*e*, representative figures regarding the adjustability of the subject matter mechanism are given.

Figure 6A:
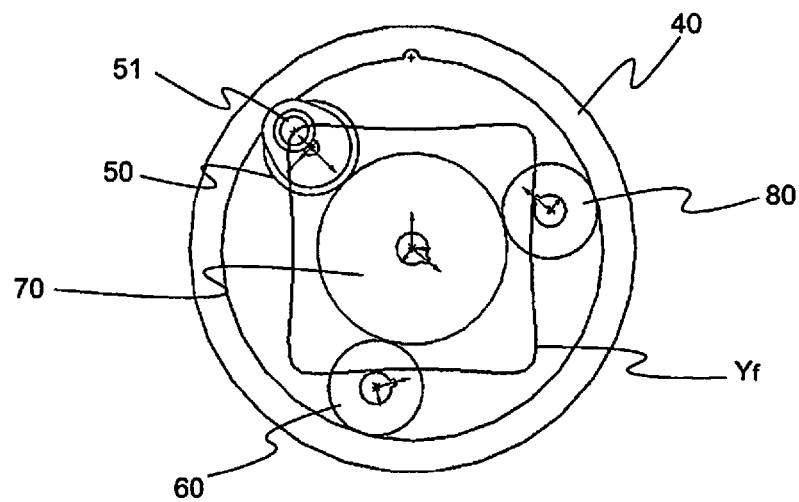
Figure 6B:
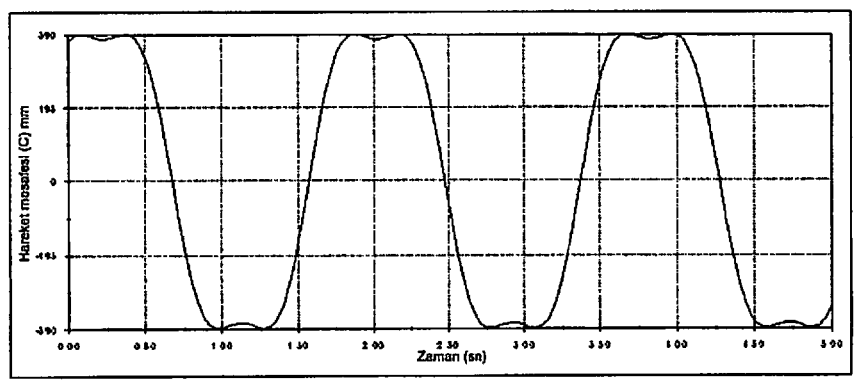

In FIGS. 6*a* and 6*b*, an example regarding the movement characteristics which the subject matter mechanism illustrates in different thread sizes is given.

DETAILED DESCRIPTION OF THE INVENTION

In this detailed explanation, the subject matter mechanism is explained with references to figures in order to make the subject matter more understandable without forming any restrictive effect. Accordingly, in the explanation below and in the subject matter figures, the subject matter invention is assumed to be applied in providing movement of the ram of a press. However, in alternative embodiments, the subject matter invention can also be used in any field where the rotational movement is required to be transformed into different movements.

Figure 1:
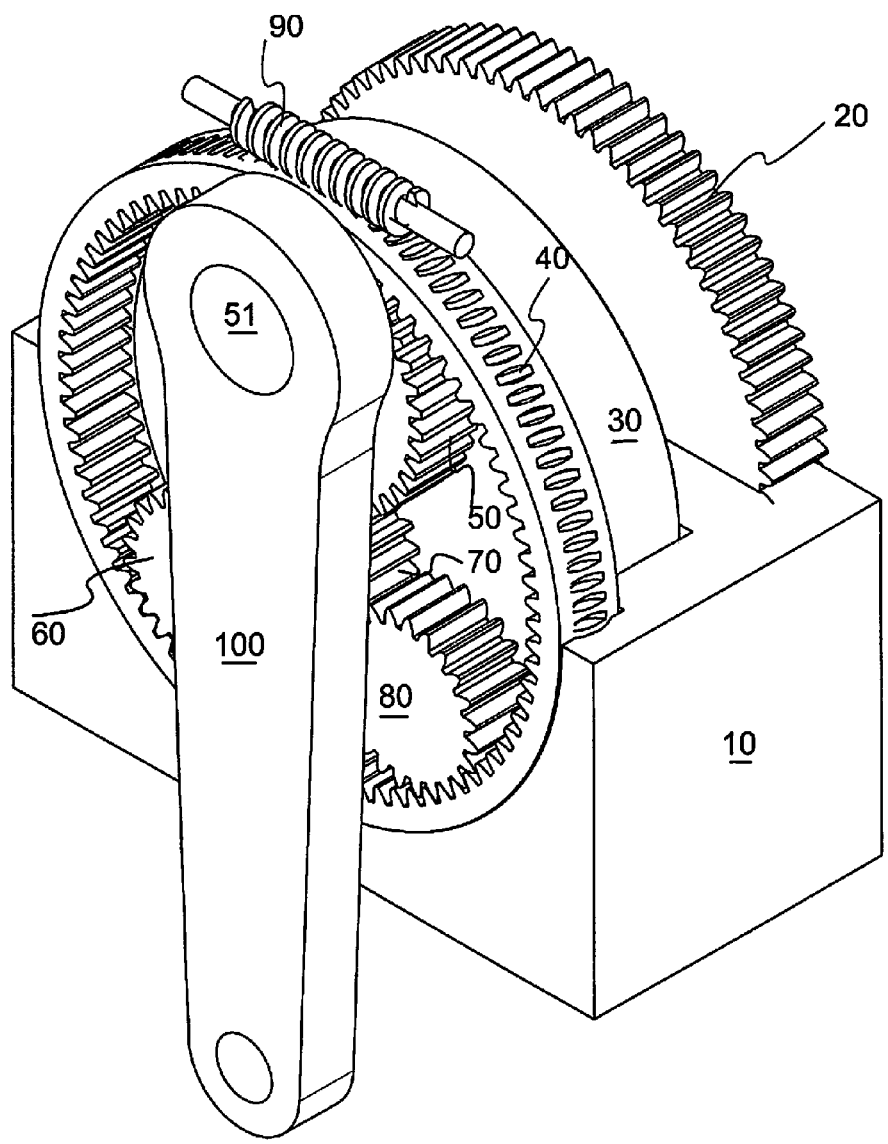
In FIG. 1, the perspective view of the subject matter mechanism is given.
Figure 2:
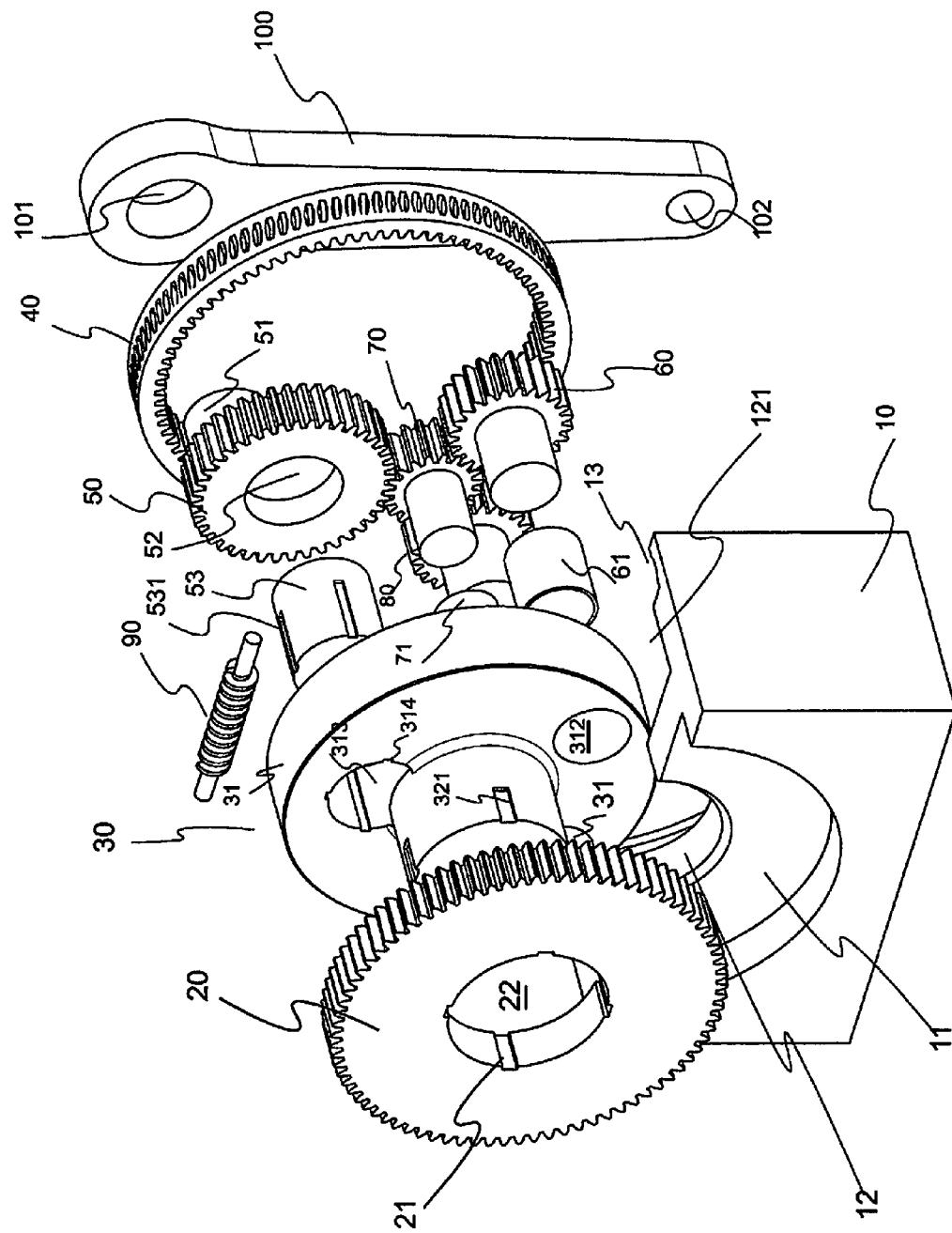
In FIG. 2, the exploded view of the subject matter mechanism is given.

With reference to FIGS. 1 and 2, the subject matter mechanism essentially has a mechanism body (10) with slots onto which some elements forming the mechanism are placed. On said mechanism body (10), a planet carrier (30) is rotatably placed. Said planet carrier (30) is rotated around the own axis thereof by means of a main planet gear (20) transferring the drive coming from a drive means to the planet carrier (30). Said planet carrier (30) carries the gears which are positioned in a similar manner to the planet gear group on the other lateral surface and whose details will be given later. At the continuation of the planet carrier (30), there is a ring gear (40) on the mechanism body (10), which is positioned rotatably. Said ring gear (40) has an annular structure and preferably both of the inner wall and the external wall thereof have a geared structure. Said inner wall is connected to the gears (50, 60, 80) realizing the planet gear function in the inner wall gear group.

Figure 3:
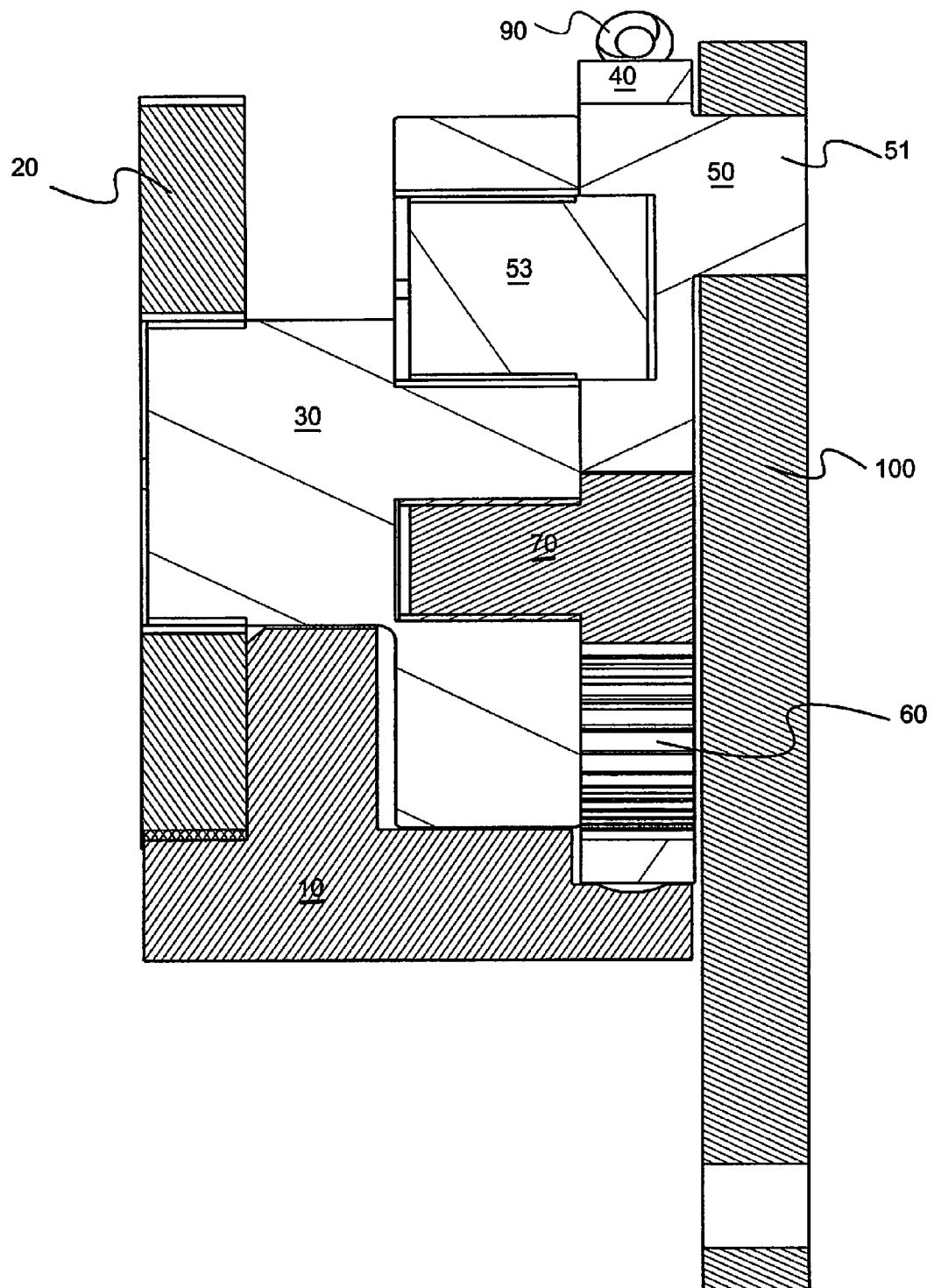
In FIG. 3, the cross sectional view of the subject matter mechanism is given.

The mechanism body (10) has a structure similar preferably to a rectangular prism. On the mechanism body (10), there is a main planet gear slot (11) in semi-circular form where the half of the main planet gear (20) is placed. With reference to FIGS. 2 and 3, said planet carrier (30) comprises a wide part (121) with a hollow cylindrical structure so as to define a cross section similar to a T shape and a narrow part (32) extending at the continuation of said wide part (121). Accordingly, also the mechanism body (10) has a planet carrier slot (12) with a structure so as to be compliant with the form of the bearing and with a size where half of the planet carrier (30) can be placed. At the continuation of said planet carrier slot (12), a ring gear slot (13) with a semi-circle form where half of the ring gear (40) is placed is formed.

The connection aperture (22) of the main planet gear (20) is placed into the narrow part (32) of the planet carrier (30). During assembly, the wedge slots (21, 321) formed on the external circumference of the inner part of the connection aperture (22) are corresponded to each other, and by means of the wedges (not illustrated in the figure) placed into these slots (21, 321), a rigid connection between the main planet gear (20) and the planet carrier (30) is obtained, thus, the planet carrier (30) rotates together with the main planet gear (20).

Said gears positioned so as to form a similar structure with the planet gear group; comprise a main planet gear (50) connected with the gear inner wall of the ring gear (40); two support planet gears (60) and a sun gear (70) which is connected to said three gears (50, 60) and which is positioned in the middle. Both the support planet gears (60) and the sun gear (70) have a pinion gear structure, the main planet gear (50) is in annular gear form which has a bearing opening (52) in the middle. Accordingly, on the lateral surface of the wide part (31) of the planet carrier (30), there are 4 bearing slots (311, 312, 313) where one of them is not illustrated in the figures and whereon the gears (50, 60, 70, 80) forming said gear group are bedded. Preferably three of said bearing slots (311, 312, 313) are close to the external circumference of the wide part (121) so as to define the corners of a triangle and the other is embodied so as to be in the middle region of the wide part (121).

Accordingly, the gears (50, 60, 70, 80) are connected to the planet carrier (30) by means of gear bearings (53, 61, 71) which are placed into said bearing slots (311, 312, 313) and where one is not illustrated in the figures. Preferably, there are wedge slots (314, 531) on the main planet gear (50) bearing (53) and on the bearing slot (313) where this bearing (53) is placed, and thanks to this, a rigid connection is formed between the two members. On the other hand, the bearings (61, 71) of the other gears (60, 70, 80) can freely rotate inside the own bearing slots (311, 312) thereof. However, in alternative embodiments, there may also be a wedged connection between all of the bearings (61, 71) and the bearing slots (311, 312). On the other hand, on the lateral surface of the main planet gear (50), preferably in a region close to the external circumference, there is an arm hinge point (51) which has a tabular form and whereon the rod arm (100) is connected so as to be able to move. The rod arm (100) comprises an upper hinge slot (101) on the upper end thereof where the hinge point (51) is placed and a lower hinge slot (102) on the lower end thereof wherein a load (110) is hinged.

As a result, thanks to the support gear group comprising the sun gear (70) and the planet support gears (60, 80) provided in addition to the main planet gear (50), in applications like press, the axial forces arriving to the arm hinge points (51) are distributed on said gears, thus a mechanism which is much firmer, much more stabile and which can function with high tonnages is provided. In alternative embodiments, the number of the support gear groups can be increased in an extent that the dimensions of the ring gear (40) permit. In such a case, there should be no contact between the gears in one support gear group and the gears in another support group.

In a preferred embodiment of the subject matter invention, the main planet (50) gear is bigger than the other gears (50, 60, 70, 80) and it has a diameter equal to the half of the ring gear (40). However, the sun gear (70) is not concentric with the ring gear (40). Thus, a planet gear mechanism arises which is not concentric and symmetric and thanks to this structure, rotational movement can be transformed into linear movement. On the other hand, in alternative embodiments, provided that the desired movement characteristic is obtained, the dimensions and their relative sizes of the gears can be changed. For instance, in an alternative embodiment, the main planet gear (50) can be so as to have a diameter which is smaller than or equal to the diameters of the support planet gears (60, 80). With reference to FIGS. 6a and 6b, in case the main planet (50) and the support planet gears (60, 80) have equal diameters, for instance, the ram of a press realize a short distance hitting movement at the bottom and at the top point.

The representative views of this embodiment and the operating type are given in the figures between FIGS. 4a and 4e. As can also be seen from these figures, when the planet carrier (30) rotates clockwise when the hinge point is in a position ($51_1$), the hinge point (51) on the main planet gear (50) passes from the top point to the bottom point by following a linear route ($Y_1$) after a half tour of 180 degrees. When the planet carrier (30) completes the tour after rotating 180 degrees more, the hinge point (51) will return to the beginning position by moving in a linear direction from downwards to upwards.

In more details, when the main planet gear (20) is rotated by means of a motor (not illustrated in the figure), the planet carrier (30) connected to it and the gears (50, 60, 70, 80) on the planet carrier (30) realize an orbital movement in the same direction. On the other hand, during this movement the ring gear (40) is in fixed position, all of the other gears (50, 60, 70, 80) rotate around themselves in the direction of the arrows illustrated in the related figures. On the other hand, during this movement, for instance in a press application, in the bottom point, the response force arising when the press head (ram) hits the material is distributed to the sun gear (70) and the support gears (60, 80) through the arm hinge point (51), from there it is distributed onto the remaining elements, thus the affect arriving to the arm hinge point (51) is minimized.

As a novelty of the subject matter invention, by changing the position of the arm hinge point (51) on the main planet gear (50), the movement characteristics can also be changed. Accordingly, the routes (Ya, Yb, Yc, Yd, Ye) are illustrated in FIG. 4f which the hinge point (51) will follow with respect to the 5 different positions (51a, 51b, 51c, 51d, 51e) selected on the main planet gear (50). Accordingly, in the furthest position (51a) from the main planet gear (50) center, the hinge point (51) will follow a linear route (Ya) while the planet carrier (30) rotates, the hinge point (51) will follow elliptical orbits (Yb, Yc, Yd), which are gradually bulging, at the positions (51b, 51c, 51d) selected which are closer to the center and finally, in the position (51e) selected in the center of the main planet gear (50), the orbit the hinge point (51) follows is naturally a circle (Ye).

Particularly, when the hinge point (51) is in position 51a, when the linear route (Ya) obtained and the axis (E) of the guide (111) are coincided, the relative rotation movement between the rod arm (100) and the car (110) to which this arm is hinged is set to zero. Thus, in presses, by providing the ram and the rod arm (100) to behave as one rigid piece, a firm structure is obtained. Moreover, thanks to this, since hinge elements will not be used in the connection point, the lubrication and heating problems and the hinge costs are eliminated. In a similar manner, for instance, in inner combustion motors, the movement of the rod together with the piston as a whole eliminates the lateral forces on the piston, thus a shorter rod can be used when compared with classic crank-connection rod mechanisms. With the usage of this mechanism, the classical crank-shaft design will also change.

In the subject matter invention, it is possible to adjust the movement distance (L) of the rod arm (100). In this adjustment process, the main planet gear (50) is rotated around itself to the desired extent, the distance between the hinge point (51) and the ring gear (40) center and the relative position of the hinge point (51) with respect to the guide axis (E) changes. Accordingly, preferably a screwed spindle is connected to the recesses in the external circumference of the ring gear (40), thanks to this, the ring gear (40) is rotated around itself at the desired angle, thus, the main planet gear (50) rotates at a certain extent around itself. On the other hand, in alternative embodiments, this adjustment process can also be realized using completely different mechanisms with a structure so as to rotate the ring gear (40) somehow.

For instance, with reference to the figures between FIGS. 4a and 4e, when the hinge point is taken to the position ($51_2$), the route ($Y_2$) it follows has an angle with respect to the guide axis (E), thus it becomes shortened. In a similar manner, with reference to FIGS. 5a and 5b, when the ring gear (40) is in the furthest position to the center thereof, the hinge point (51) follows a long elliptical orbit in the orthogonal direction, thanks to this, in the orthogonal axis, maximum movement distance (Dmax) is obtained. With reference to the figures between FIG. 5c and FIG. 5e, when the main planet gear (50) is rotated 180 degrees, the hinge point (51) reaches the closest position to the center of the ring gear (40), thanks to this, it follows a long elliptical orbit in the horizontal direction, thus, the movement amount (C) of the rod arm (100) is decreased from the longest to the shortest (Dmin).

As a result, thanks to this structure, for instance, the movement distance (C) of the ram part and the upper mould of a press can be adjusted easily with respect to the application regions. For instance, the movement distance (C) of a press can be adjusted to the minimum when work is desired to be realized with stepped mould which requires low course and high velocity, and this distance can be adjusted to maximum when press operations like deep drawing are desired to be realized. Moreover, thanks to the subject matter mechanism, a movement distance can be obtained which is equal to the diameter of the biggest gear in the mechanism, in other words, ring gear (40) in the mechanism. This brings a very serious advantage when compared with the present presses operating with crank-connection rod where a maximum movement distance equal to the radius of the eccentric gear is obtained.

The protection scope of the present invention is set forth in the annexed Claims and cannot be restricted to the illustrative disclosures given above, under the detailed description. It is because a person skilled in the relevant art can obviously produce similar embodiments under the light of the foregoing disclosures, without departing from the main principles of the present invention.

The invention claimed is:

1. A movement transformation mechanism to transform rotational movement to different movement characteristics, the mechanism comprising:

a first main planet gear, said main planet gear is adapted to rotate;

a planet carrier, said planet carrier is adapted to rotate together with said first main planet gear;

a ring gear comprising at least a toothed inner surface and a second main planet gear comprising a toothed outer surface, said ring gear is positioned with respect to said planet carrier and is independent of the planet carrier, the second main planet gear and planet carrier are rotatably secured to each other with a bearing therebetween, the second main planet gear toothed outer surface is in contact with the toothed inner surface of the ring gear; and a connecting rod pivoted by the second main planet gear; wherein, the diameter of said ring gear is two times greater than the diameter of the second main planet gear, at least two support planet gears comprising a toothed outer surface said support planet gears being rotatably connected with respect to the planet carrier and between the second main planet gear and the ring gear, said at least two planet gears toothed outer surface being in contact with the toothed inner surface of the ring gear; and at least one first support gear comprising a sun gear positioned so as to contact the at least one support gear group, wherein the sun gear is not concentric with the ring gear.

2. The mechanism of claim 1, further comprising a pivoting point on the front surface of the second main planet gear, wherein while the ring gear is held fixed, when the planet carrier is rotated, in order to provide linear movement of the pivoting point, the pivoting point has a distance to the second main planet gear center equal to the second main planet gear radius.

3. The mechanism of claim 1, further comprising at least two additional support planet gears comprising toothed outer surfaces, the at least two additional support planet gears are positioned so as not to contact the gears in said first support gear, the at least two additional support planet gears are rotatably connected to the planet carrier, the additional support planet gears toothed outer surfaces are in contact with the toothed inner surface of the ring gear, and at least one additional support gear with an additional sun gear positioned so as to contact the at least two additional support planet gears.

4. The mechanism of claim 1, further comprising an adjustment mechanism which rotates the main planet gear on an axis by rotating the ring gear while the planet carrier is fixed, in order to change the position of the pivoting point with respect to the orthogonal axis passing through the center of the ring gear.

5. The mechanism of claim 4, wherein the ring gear of said adjustment mechanism comprises a geared external wall and a threaded rod connected to said external wall.

6. The mechanism of claim 1, further comprising additional pivoting points on the second main planet gear, whereon the connecting rod is pivoted, by changing the distance between the pivoting point and the ring gear center, during the rotation of the planet carrier, in order to provide the movement of the pivoting point in different orbits.

7. The mechanism of claim 1, further comprising a mechanism body with a housing so as to comprise at least some of the first main planet gear, planet carrier and the ring gear.

8. The mechanism of claim 4, wherein the planet carrier comprises a narrow part connected to the first main planet gear in a rigid manner and a wide part wherein the second main planet gear and support planet gears and the sun gear are supported, each of which has a hollow structure.

9. The mechanism of claim 4, wherein said ring gear has a ring-like structure.

* * * * *